United States Patent Office.

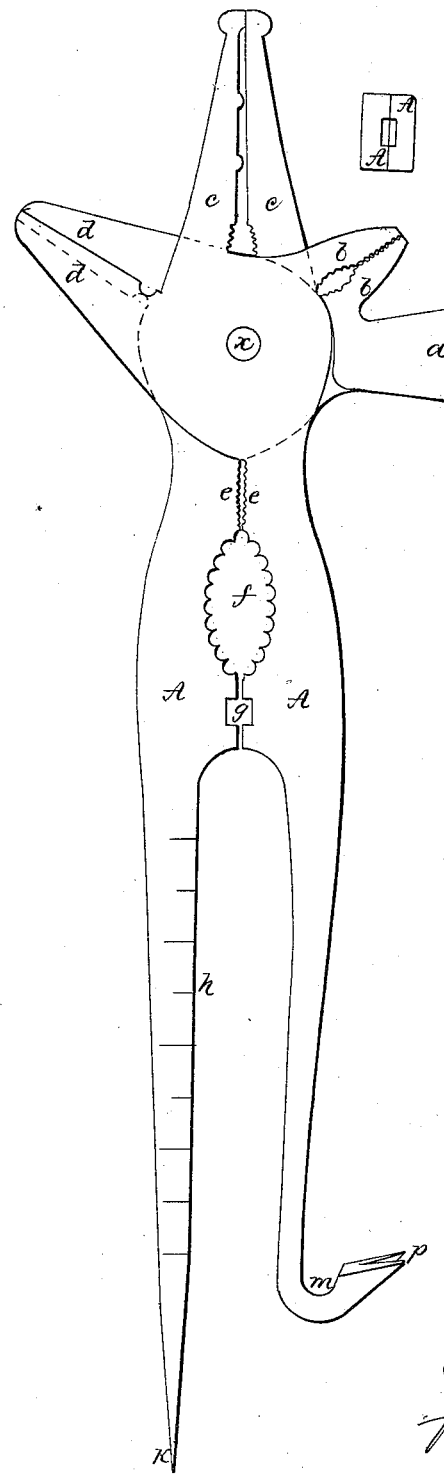

EMILE GRANIER, OF PARIS, FRANCE.

Letters Patent No. 95,793, dated October 12, 1869; patented in France, May 9, 1868.

IMPROVEMENT IN COMBINED TOOL.

The Schedule referred to in these Letters Patent and making part of the same.

*To all whom it may concern:*

Be it known that I, EMILE GRANIER, of the city of Paris, France, have invented a new and useful Combined Tool; and I do hereby declare that the following is a full, clear, and exact description of the same, reference being had to the accompanying drawings, which form part of this specification, and in which is represented a longitudinal view of a combined tool, constructed according to my invention.

This invention consists in a device of novel construction, whereby several tools are combined in one.

Referring to the accompanying drawings—

A A are two levers, fitted to each other, and pivoted together at $x$, so as to operate substantially on the principle of ordinary pliers or pincers, and may be used as such. These levers are so constructed, as, when combined, to form a tool, such as that represented in the drawings, and combining various tools of utility and convenience.

In enumerating the various features of utility herein combined—

$a$ is a hammer.

$b\ b$ are jaws, one formed upon each of the said levers A A, so as to open and close with the like action of the same, and are suitable for holding crucibles or other similar articles.

An elliptic opening is formed between them, near thin shoulders, for grasping cylindrical surfaces.

A rectilinear opening, similarly arranged, may be formed between the main jaws $c\ c$ of the tool, for grasping square or angular surfaces.

$d\ d$ are cutting-blades, one formed on each of the said main levers, so as to open and close with the action of the same, and constituting a pair of shears for cutting sheet-tin or other sheet-metal.

Near the shoulders of these blades, their cutting-edges have formed in them semicircular recesses for the more convenient cutting of wire and other articles of similar nature.

$e\ e$ are clamping-jaws, formed behind the rivet $x$ and are designed to serve in the capacity of a hand-vise.

$f$ is an elliptic opening, formed between the levers and behind the said clamping-jaws $e$, having their faces provided with larger corrugations than the other biting or clamping-surfaces.

This opening $f$ is useful for grasping cylindrical or round surfaces, such as gas-pipes, or round nuts, &c. It may also serve as a compresser for bottle-corks in wine-making, and other bottle-closing purposes, and also for a nut-cracker, its curved surfaces being so formed, for enclosing the nut, as to more effectually prevent the flying asunder of its fragments, when broken apart or cracked.

$g$ is a square opening, formed between the levers for reception of auger-shanks, screw-taps, and other similar articles, the tool itself serving as a handle thereto.

$h$ is a straight-edge or ruler, for ruling straight lines of limited length, and it has or may have a measuring-scale marked thereon, as represented.

The rear extremity $k$ of said lever is constructed so as to form a screw-driver or a cold chisel.

The opposite lever, near its end, as at $m$, is bent in the form of a hook, for lifting off the covers of stoves, furnaces, &c., while the extremity of the said lever, thus turned, is formed into a claw, $p$, for extracting nails, tacks, &c.

What I claim as my invention, and desire to have secured by Letters Patent, is—

The combined tool, constructed as described, and for the purposes herein set forth.

EMILE GRANIER.

Witnesses:
J. N. ZUST,
F. OLCOTT.